United States Patent
Takahashi et al.

(10) Patent No.: US 11,046,025 B2
(45) Date of Patent: Jun. 29, 2021

(54) METHOD OF PRODUCING RESIN-IMPREGNATED FIBER BUNDLE ROLL BODY

(71) Applicant: Toray Industries, Inc., Tokyo (JP)

(72) Inventors: Jumpei Takahashi, Nagoya (JP); Shigeru Kawashima, Nagoya (JP); Daisuke Nagamatsu, Nagoya (JP); Tadashi Watanabe, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 141 days.

(21) Appl. No.: 16/485,960

(22) PCT Filed: Feb. 5, 2018

(86) PCT No.: PCT/JP2018/003853
§ 371 (c)(1),
(2) Date: Aug. 14, 2019

(87) PCT Pub. No.: WO2018/155151
PCT Pub. Date: Aug. 30, 2018

(65) Prior Publication Data
US 2020/0047431 A1    Feb. 13, 2020

(30) Foreign Application Priority Data
Feb. 22, 2017    (JP) .............................. JP2017-030859

(51) Int. Cl.
*B29C 70/32*    (2006.01)
*B29C 70/54*    (2006.01)
*G01B 11/10*    (2006.01)

(52) U.S. Cl.
CPC .............. *B29C 70/32* (2013.01); *B29C 70/54* (2013.01); *G01B 11/105* (2013.01)

(58) Field of Classification Search
CPC ........ B29C 70/32; B29C 70/54; G01B 11/105
See application file for complete search history.

(56) References Cited

U.S. PATENT DOCUMENTS

| 7,999,561 B2 * | 8/2011 | Uozumi | B29B 15/122 324/658 |
| 2016/0076874 A1 * | 3/2016 | Corradini | B65H 81/00 242/443 |

FOREIGN PATENT DOCUMENTS

| JP | 02-231141 A | 9/1990 |
| JP | 2004-209923 A | 7/2004 |

(Continued)

OTHER PUBLICATIONS

Machine translation of Japanese Patent 2007-185827, date unknown.*

*Primary Examiner* — Jeffry H Aftergut
(74) *Attorney, Agent, or Firm* — DLA Piper LLP (US)

(57) ABSTRACT

A method of producing a resin-impregnated fiber bundle roll body includes unwinding a fiber bundle from a bobbin; winding the fiber bundle on a winding core rotating around a fixed axis through a movable winding head to prepare a product; and leading the fiber bundle taken off in the unwinding to the winding between the unwinding and winding, wherein the leading or winding includes a resin impregnating the fiber bundle, and the winding includes a fiber content calculation of a fiber content in a layer of the fiber bundle on the winding core of an intermediate product to control one according to the fiber content: a resin adhesion amount in the resin adhesion operation; a winding tension of the fiber bundle applied to the intermediate product; a removal amount of a surplus resin layer on an outer surface of the intermediate product; and a resin viscosity in the intermediate product.

6 Claims, 10 Drawing Sheets

(56) References Cited

FOREIGN PATENT DOCUMENTS

| | | |
|---|---|---|
| JP | 2007-185827 A | 7/2007 |
| JP | 2009-119717 A | 6/2009 |
| JP | 2009-126052 A | 6/2009 |
| WO | WO-2016/166537 A1 * | 10/2016 |

* cited by examiner

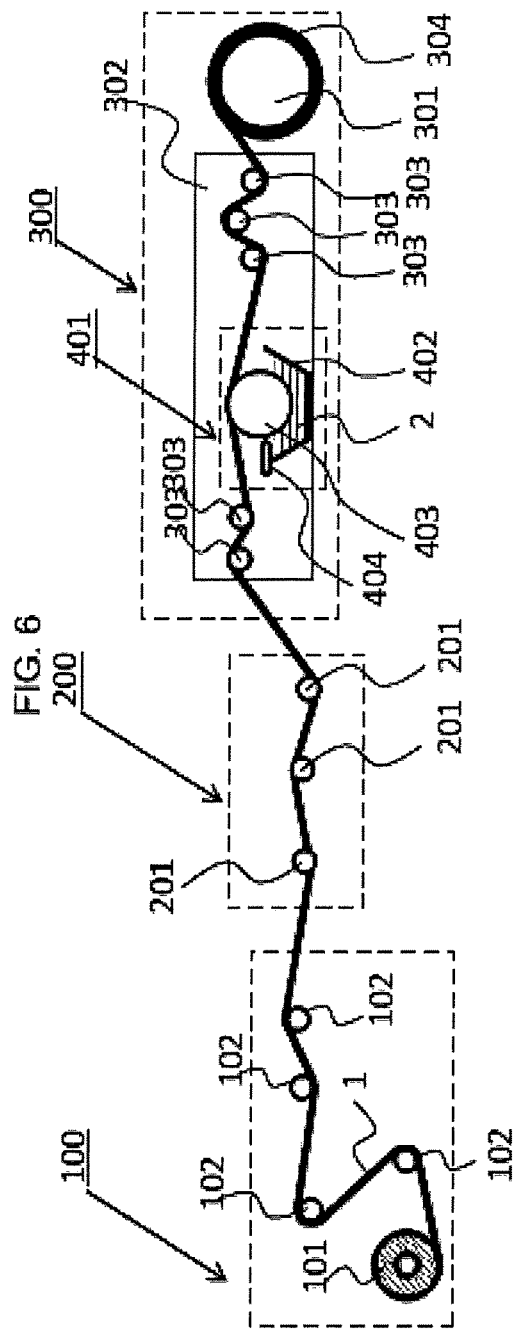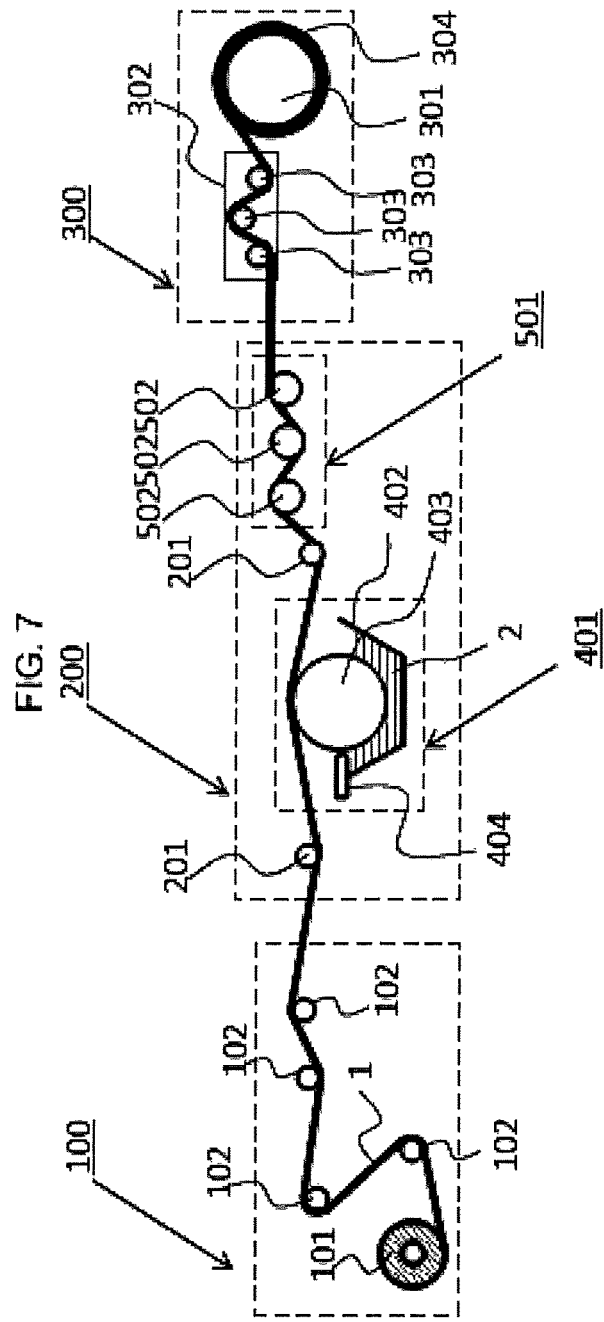

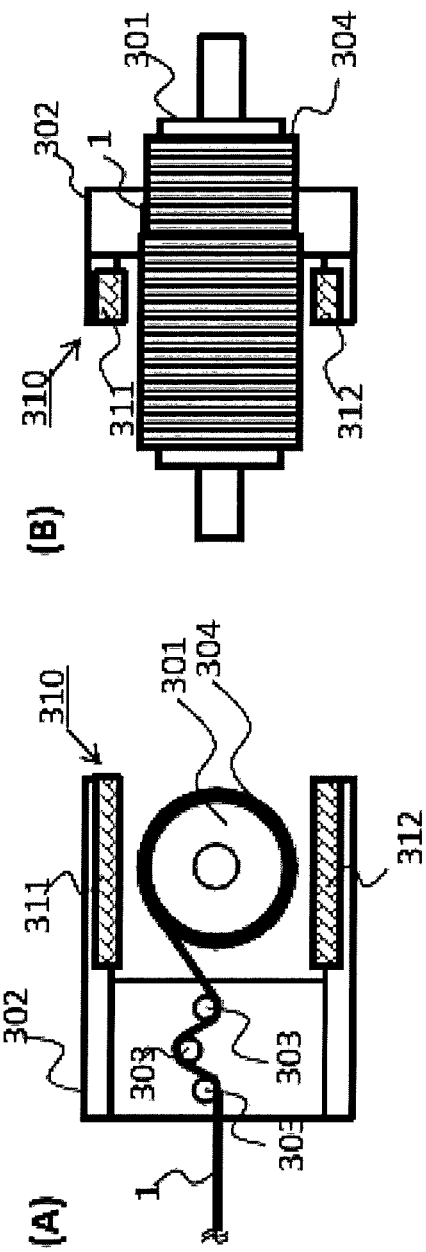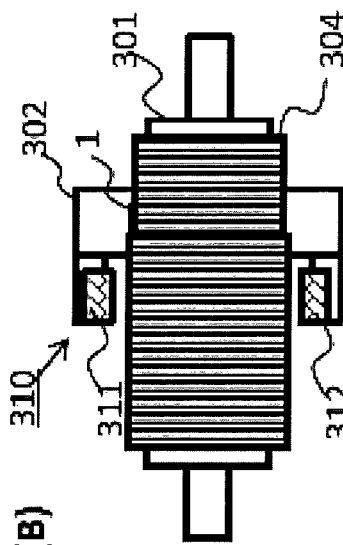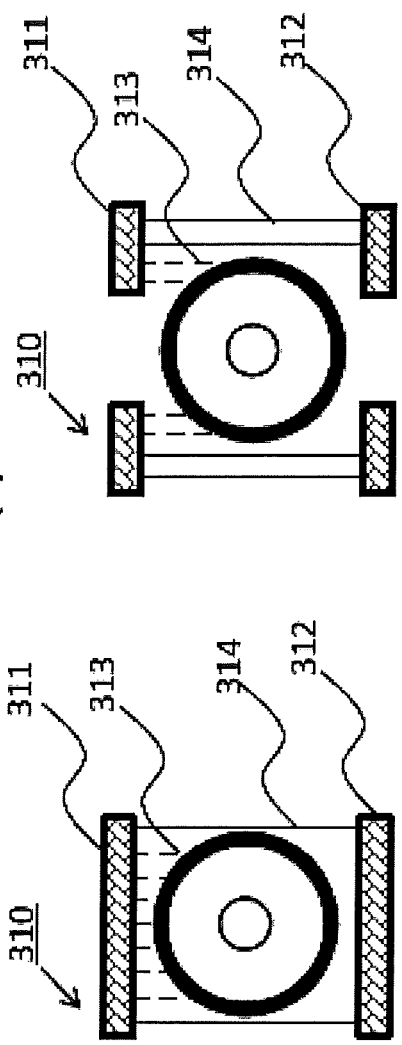

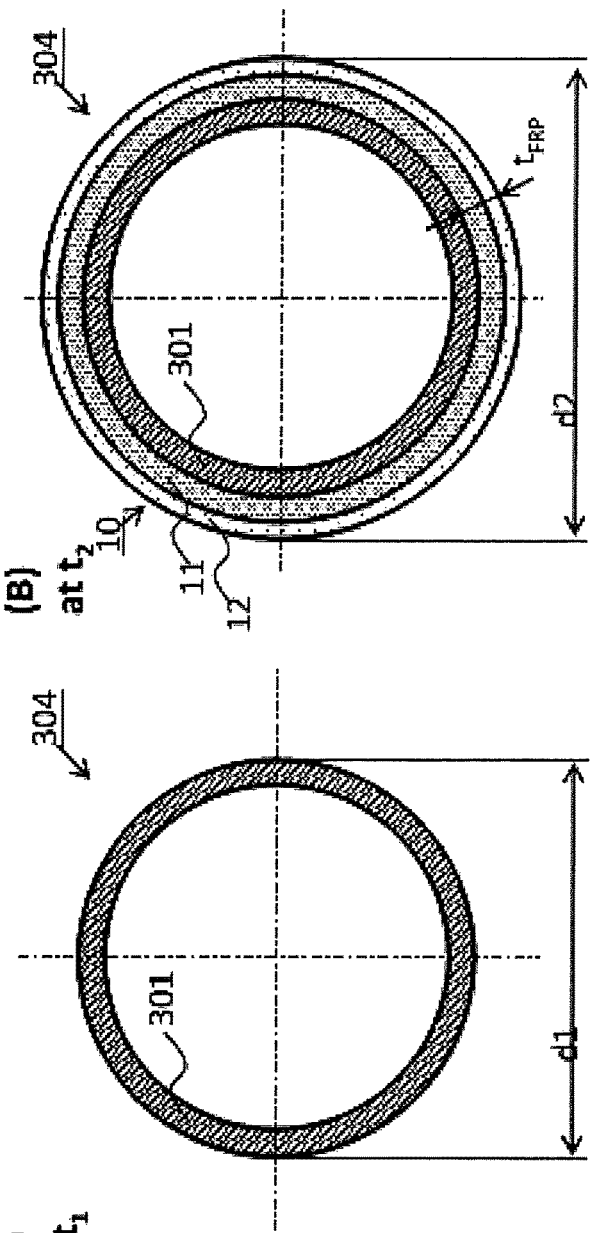
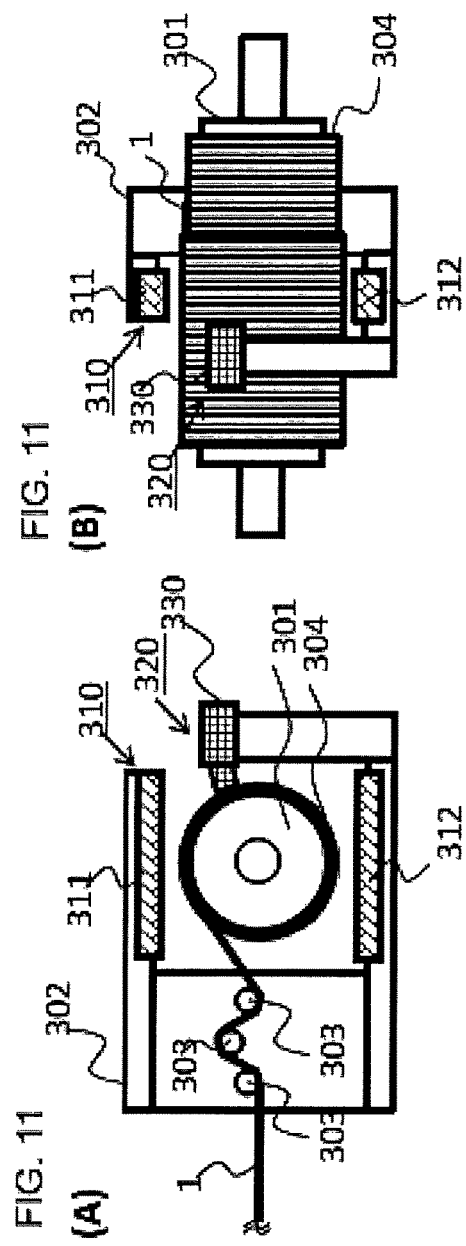

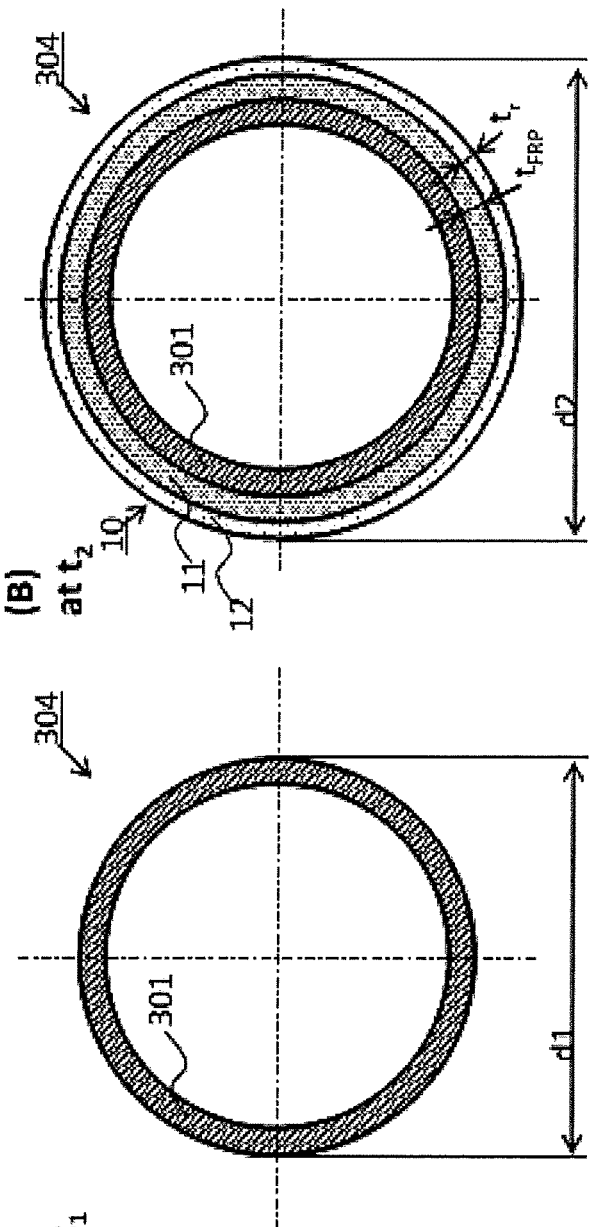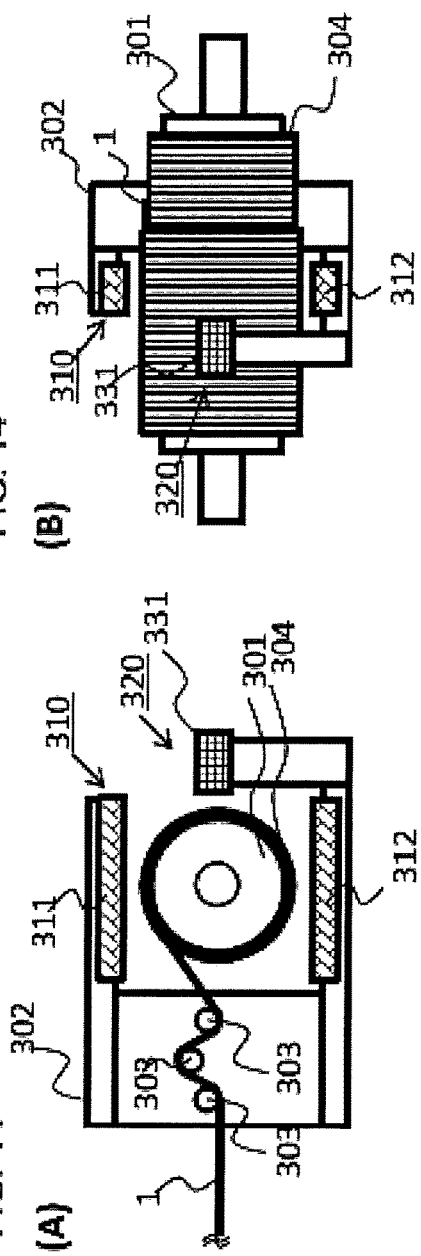

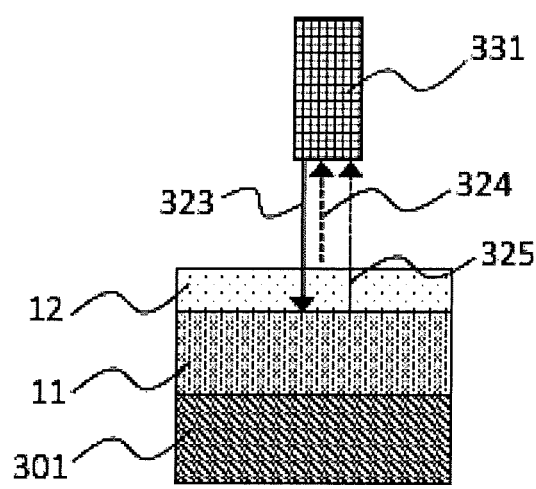

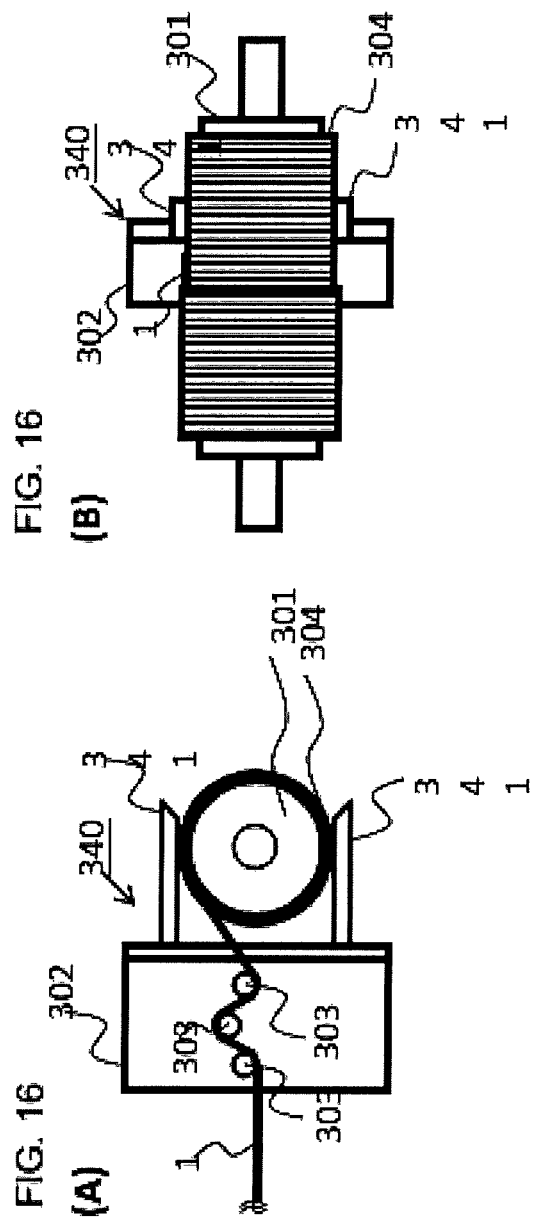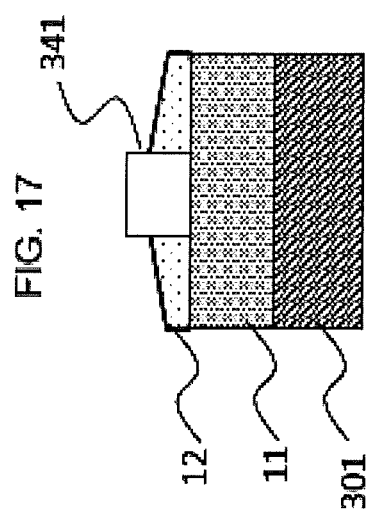

METHOD OF PRODUCING RESIN-IMPREGNATED FIBER BUNDLE ROLL BODY

TECHNICAL FIELD

This disclosure relates to a method of producing a resin-impregnated fiber bundle roll body to be used for pipes or pressure vessels made of fiber-reinforced plastic (FRP).

BACKGROUND

FRP, a composite resin material reinforced with reinforcing fibers is widely used because of its weight lighter than that of metal materials such as iron and aluminum while being capable of exhibiting strength and rigidity equal to or better than those of metal materials.

Fiber bundles and resin have to be combined in a step of producing the FRP since the raw material liquid resin is generally provided separately from the other raw material fiber bundle consisting of single fibers.

FIG. 1 shows a schematic flowchart of a forming method of filament winding (FW) in which a fiber bundle rolled up into a bobbin is continuously taken off to be combined and impregnated with resin and then rolled around a winding core to produce a product (resin-impregnated fiber bundle roll body). In such a forming method of continuously taking off the fiber bundle to produce FRP products, it is important and has been developed for process control that fiber bundle formation is stably kept without twisting and folding or that the fiber content (or resin content) as a mixing ratio of the fiber bundle and the resin is stabilized within a desirable range set uniquely to each product.

JP-H02-231141-A discloses improving quality with a target winding angle of a fiber bundle by fine-tuning a position and angle of fiber bundle-unreeling head according to an outer diameter detected in each step during a winding process to roll up the fiber bundle on a winding core by a non-contact type outer diameter measuring device that measures the outer diameter of the intermediate product without contacting.

JP 2009-119717-A discloses precisely controlling fiber contents of products by changing the resin adhesion amount in the upstream process according to a fiber content value detected by optically measuring either the capacitance or the thickness of fiber bundle impregnated with adhered resin in a process right before the winding process of fiber bundle by the FW device.

Generally in the FW process, fiber bundles are given tension during conveyance and rolling up so that formation of fiber bundles is stable in processes and that fiber bundles are prevented from loosening during or after the winding process. Therefore, an inner layer resin-impregnated fiber bundle rolled in advance is tightened by further rolling an outer layer resin-impregnated fiber bundle around the inner layer side so that resin is squeezed from the inner layer resin-impregnated fiber bundle.

As a result, fiber contents in an intermediate product and the final product are not the same as in-process fiber content as shown in FIG. 2 with a cross section view, in which actual resin-impregnated fiber bundle 11 at the inner layer side has a fiber content higher than that of in-process while surplus resin layer 12 at the outer layer side only contains resin without fiber bundle.

The actual resin-impregnated fiber bundle layer 11 containing fiber bundles greatly contributes to product performance while surplus resin layer 12 doesn't contribute thereto so much. When the thickness of surplus resin layer 12 made of a certain kind of resin is excessive in the intermediate product, frictional force to hold fiber bundles on the outer surface of the intermediate product in a winding process might be too small so that the fiber bundle cannot be placed according to the design or might be loosened because of slippage of fiber bundle.

Further, when the process tension and resin viscosity are off balance, resin might fall off in a process or an intermediate product so that the difference between the preset in-process fiber content and the final fiber content in the product might be caused.

Thus, because conventional process control and product configuration have to be designed as considering the surplus resin layer to be squeezed and loss of resin in a process, they should be improved to achieve quality control based on the condition of the resin-impregnated fiber bundle after winding.

Accordingly, it could be helpful to provide a method of producing a resin-impregnated fiber bundle roll body, of which production condition reflects the condition of the resin-impregnated fiber bundle after winding to contribute to the product quality improvement.

SUMMARY

We thus provide:

(1) A method of producing a resin-impregnated fiber bundle roll body, comprising: an unwinding step to take off a fiber bundle from a bobbin; a winding step to roll up the fiber bundle on a winding core rotating around a fixed axis through a movable winding head to prepare a product; and a leading step to lead the fiber bundle taken off in the unwinding step to the winding step between the unwinding step and the winding step, wherein the leading step or the winding step includes a resin adhesion operation to impregnate the fiber bundle with a resin, and the winding step includes a fiber content calculation operation to calculate a fiber content $V_f$ [%] in a layer of the resin-impregnated fiber bundle being rolled up on the winding core of an intermediate product to control any one of (i) to (iv) according to the fiber content $V_f$ [%]:

(i) a resin adhesion amount in the resin adhesion operation;
  (ii) a winding tension of the fiber bundle applied to the intermediate product;
  (iii) a removal amount of a surplus resin layer generated on an outer surface of the intermediate product; and
  (iv) a resin viscosity in the intermediate product.

(2) The method of producing a resin-impregnated fiber bundle roll body according to (1), wherein the winding step further includes a resin-impregnated fiber bundle layer thickness calculation operation to calculate a thickness $t_{FRP}$ of the layer of the resin-impregnated fiber bundle and then the fiber content calculation operation is performed by using the thickness to $t_{FRP}$.

(3) The method of producing a resin-impregnated fiber bundle roll body according to (2), wherein the winding step further includes an outer diameter measurement operation to measure an outer diameter of the winding core or the intermediate product, and the thickness $t_{FRP}$ of the layer of the resin-impregnated fiber bundle, formed between a first time $t_1$ and a second time $t_2$ later than first time $t_1$, is calculated by using: a first outer diameter $d_1$ of the winding core or the intermediate product at the first time $t_1$; and a second outer diameter $d_2$ of the winding core or the intermediate product at the second time $t_2$, the first and second outer diameters $d_1$ and $d_2$ being measured by the outer diameter measurement operation.

(4) The method of producing a resin-impregnated fiber bundle roll body according to (3), wherein the winding step further includes a surplus resin layer thickness measurement operation to measure a thickness $t_r$ of the surplus resin layer generated on the outer surface of the intermediate product, the thickness $F_{RP}$ of the layer of the resin-impregnated fiber bundle formed between the first time $t_1$ and the second time $t_2$ is calculated by using: the first outer diameter $d_1$; the second outer diameter $d_2$; and the thickness $t_r$ of the surplus resin layer measured by the surplus resin layer thickness measurement operation at the second time $t_2$.

(5) The method of producing a resin-impregnated fiber bundle roll body according to (4), wherein the surplus resin layer thickness measurement operation is performed by a photoelectric means or an ultrasonic wave means.

(6) The method of producing a resin-impregnated fiber bundle roll body according to any one of (3) to (5), wherein the outer diameter measurement operation is performed by a photoelectric means.

Our methods thus contribute to an improved quality of product by setting a production condition according to the fiber content of the resin-impregnated fiber bundle after winding.

BRIEF DESCRIPTION OF THE DRAWINGS

FIG. 6 is a schematic flowchart showing another example with different position of resin adhesion means.

FIG. 7 is a schematic flowchart showing yet another example with a resin impregnation promotion process.

FIGS. 8(A) and 8(B) are schematic views showing an example of a winding process with outer diameter measurement means.

FIGS. 9(A) and 9(B) are schematic views showing an example of outer diameter measurement.

FIGS. 10(A) and 10(B) are cross section views showing an example of a resin-impregnated fiber bundle roll body at time of $t_1$ and $t_2$.

FIGS. 11(A) and 11(B) are schematic view showing an example of a winding process with an ultrasonic wave type surplus resin layer thickness measurement means.

FIGS. 13(A) and 13(B) are cross section view showing an example of a resin-impregnated fiber bundle roll body at time of $t_1$ and $t_2$.

FIGS. 14(A) and 14(B) are schematic views showing an example of a winding process with a photoelectric type surplus resin layer thickness measurement means.

FIG. 15 is a schematic view showing a surplus resin layer thickness measurement of the photoelectric type.

FIGS. 16(A) and 16(B) are schematic views showing an example of a winding process with a sandwich type outer diameter measurement means.

FIG. 17 is a schematic view showing a resin-impregnated fiber bundle layer thickness measurement of the sandwich type.

EXPLANATION OF SYMBOLS

Figure 1:
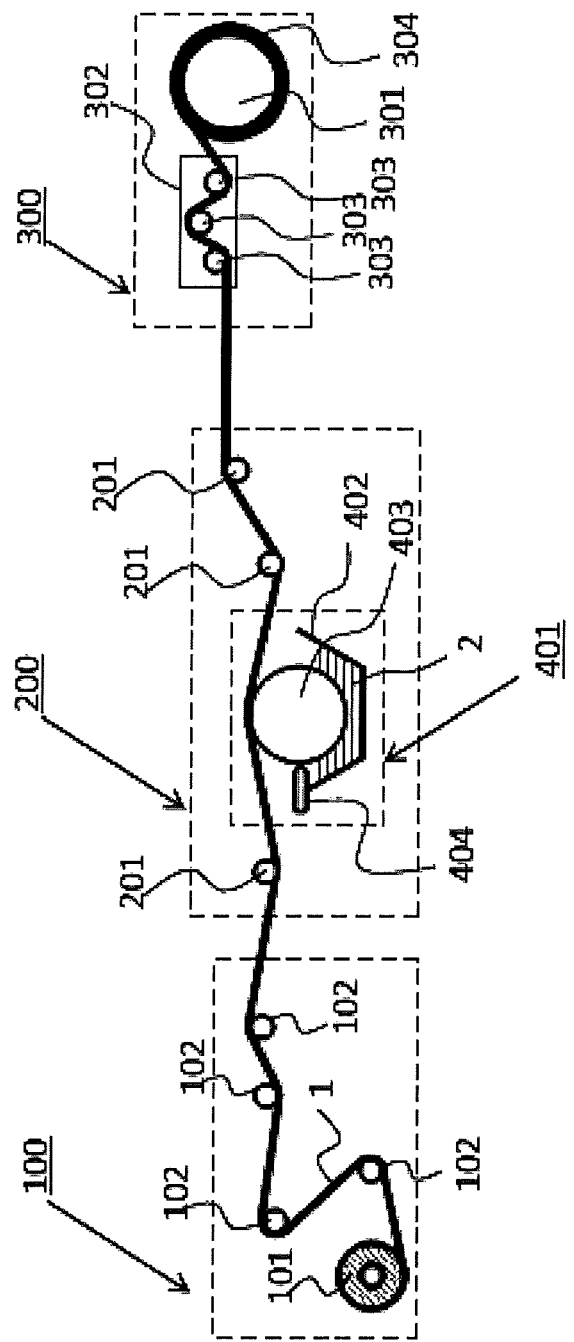
FIG. 1 is a schematic flowchart showing an example of a production process of our resin-impregnated fiber bundle roll body.
Figure 2:
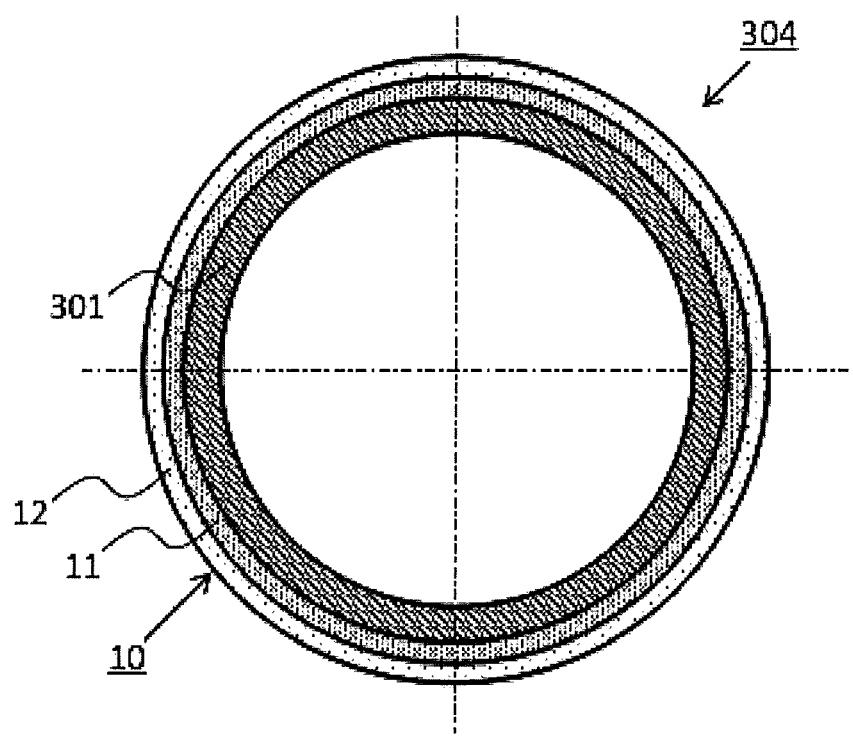
FIG. 2 is a cross section view showing an example of our resin-impregnated fiber bundle roll body.

1: fiber bundle
2: resin
10: resin-impregnated fiber bundle layer
11: actual resin-impregnated fiber bundle layer
12: surplus resin layer
51,52,53,54: guide member
55: center axis
100: unwinding process
101: fiber bundle bobbin
102: unwinding guide
200: leading process
201: leading guide
300: winding process
301: winding core
302: winding head
303: winding guide
304: resin-impregnated fiber bundle roll body
310: outer diameter measurement means
311: optical transmitter
312: optical receiver
313: interrupted ray
314: non-interrupted ray
320: surplus resin layer thickness measurement means
321: incident wave
322: reflection wave
323: incident ray
324: first reflection ray
325: second reflection ray
330: ultrasonic wave thickness meter
331: laser film thickness meter
340: sandwich type outer diameter measurement means
341: measurement head
401: resin adhesion means
402: resin bath
403: impregnation roller
404: scratching member
410: impregnation guide
501: resin impregnation promotion means
502: impregnation guide
F: reaction force to fiber bundle
M: running direction of fiber bundle
θ: angle between center axis of guide member and running direction of fiber bundle
$V_f$: fiber content of resin-impregnated fiber bundle layer
$t_{FRP}$: thickness of resin-impregnated fiber bundle layer
$t_r$: surplus resin layer thickness
$t_1,t_2$: first (second) time
$d_1,d_2$: outer diameter of intermediate product at first (second) time

DETAILED DESCRIPTION

Hereinafter, our methods will be explained in detail.

Brief Explanation of Processes

FIG. 1 shows an example of our production method of resin-impregnated fiber bundle roll body. Our production method comprises: unwinding process 100 to take off fiber bundle 1 from fiber bundle bobbin 101 without resin attached; leading process 200 to lead fiber bundle 1 taken off in unwinding process 100 to winding process 300 downstream; winding process 300 to roll up fiber bundle 1 led from leading process 200 onto winding core 301 through winding head 302 to prepare resin-impregnated fiber bundle roll body 304; and resin adhesion means 401 to attach resin to fiber bundle 1.

Brief Explanation of Guide Member

"Guide" and "guide member" in descriptions such as unwinding guide 102 and leading guide 201 are generic terms of members that contact fiber bundle 1 taken off from fiber bundle bobbin 101 and are provided to roll up fiber bundle 1 changing its height and direction to be led to a winding core without unnecessary twist and fold.

Figure 3:
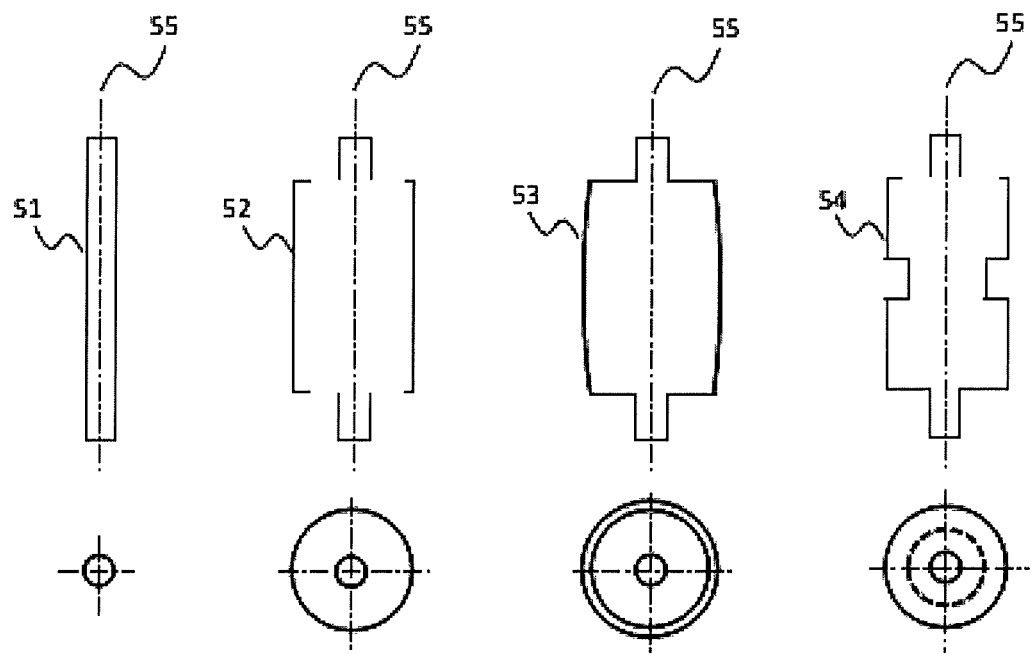
FIG. 3 shows general examples of a guide member.

FIG. 3 shows shapes of general guide members 51, 52, 53 and 54. It is preferable that guide members 51 to 54 having a stick-like shape extending in a direction are rotationally symmetric around a rotation axis (center axis 55). In FIG. 3, guide member 51 has a shape extending uniformly along center axis 55 while guide members 52, 53 and 54 have shapes with a part changing continuously or discontinuously.

Figure 4:
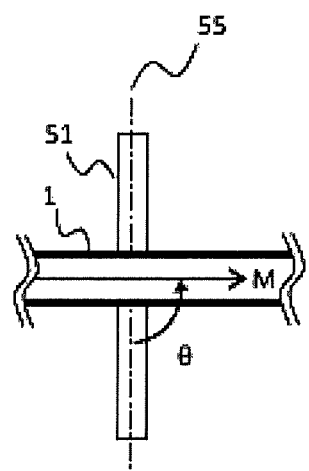
FIG. 4 is an explanation view of a fiber bundle running orthogonally to a guide member.

The guide members can regulate the position of fiber bundle 1 when center axis 55 is oriented to be approximately orthogonal to the running direction of fiber bundle 1 contacting the outer periphery of the rotationally symmetric shape. In the specification, "orthogonal" may include an allowable range of 90°±5° for angle θ between center axis 55 of the guide member and running direction M (which means a direction to move while being taken off) of fiber bundle 1 as shown in FIG. 4.

Figure 5:
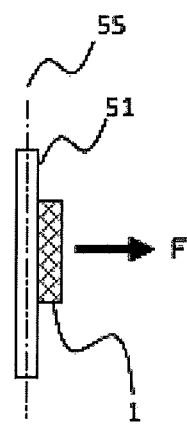
FIG. 5 is an explanation view of desirable configuration of a fiber bundle passing through a guide member.

As shown in FIG. 5 with ideal passing condition of fiber bundle 1, it is preferable that the width direction of running fiber bundle 1 is set along center axis 55 of guide member 51 so that the fiber bundle is prevented from twisting and folding with reaction force F acting in the thickness direction instead of width direction.

Fiber bundle 1 contacts a region that may be a roller member rotatable around center axis 55 which allows fiber bundle 1 to run without having excessive resistance or may be a fixed guide bar member non-rotatable around center axis 55 which allows fiber bundle to run with resistance. It is possible to select according to purposes to be achieved by a guide member provided in each process.

Unwinding Process

Unwinding process 100 comprises fiber bundle bobbin 101 and unwinding guide 102.

From viewpoints of restriction in production facility layout and economy, the number of unwinding guides 102 to lead fiber bundle taken off fiber bundle bobbin 101 to leading process 200 can be selected as being optimum for each production process. It is important that the axial direction of unwinding guide 102 is orthogonal to the running direction of fiber bundle 1. The axial direction may be the same as that of fiber bundle bobbin 101 or alternatively the directions may be orthogonal or skew to each other. From viewpoints of restriction in production facility layout and economy, the number of fiber bundle bobbin 101 can also be selected as being optimum for each production process.

Fiber

From viewpoints of rigidity and strength of resin-impregnated fiber bundle roll body obtained, it is preferable that the reinforcing fiber is a carbon fiber or a glass fiber although the reinforcing fiber may be an inorganic fiber such as glass fiber, an organic fiber such as carbon fiber and aramid fiber or combination thereof, which are generally used as reinforcing fibers for FRPs.

Leading Process

Leading process 200 is provided with leading guide 201 to lead fiber bundle taken off in unwinding process 100 to winding process 300 downstream.

The number and axial direction of leading guide 201 can be designed according to a concept similar to that of unwinding guide 101. Namely, from viewpoints of restriction in production facility layout and economy, the number of leading guides 201 can be selected as being optimum for each production process. It is important that the axial direction of leading guide 201 is orthogonal to the running direction of fiber bundle 1. The axial direction may be the same as that of fiber bundle bobbin 101 provided in unwinding process 100 or alternatively the directions may be orthogonal or skew to each other.

Winding Process

Winding process 300 is provided with: winding core 301 to be wound; winding head 302 movable freely from winding core 301; and winding guide 303 to lead fiber bundle 1 to winding core 301 in leading process 200.

In winding process 300, fiber bundle 1 led through winding guide 303 provided on winding head 302 in leading process 200 is rolled up onto winding core 301 rotatable around the axis fixed in a space. Winding head 302 moves freely as corresponding to winding turns and angle of fiber bundle preliminarily designed according to requirement of product characteristics while performing the winding onto winding core 301 to produce resin-impregnated fiber bundle roll body 304.

The number and axial direction of winding guide 303 can be designed according to a concept similar to that of unwinding guide 101 or leading guide 201. Namely, from viewpoints of restriction in production facility layout and economy, the number of winding guides 303 can be selected as being optimum for each production process. It is important that the axial direction of winding guide 303 is orthogonal to the running direction of fiber bundle 1. The axial direction may be the same as that of winding core 301 or alternatively the directions may be orthogonal or skew to each other.

Winding Core

Winding core 301 can be selected as being optimum according to the product shape and function required. For example, a hollow pipe member can be produced by using a cylindrical winding core or a core capable of being removed by melting with heat or the like so that the core is removed after the winding process of resin-impregnated fiber bundle or after the resin curing process for thermosetting resin employed. Further, a pressure vessel can be produced by using a metal or resinous liner member of a winding core having a sealing ability to a predetermined content.

As for products made of thermosetting resin such as hollow pipe member and pressure vessel, after the winding process is completed, the finish process comprising resin curing process or additional processes such as surplus part trimming is performed to produce final products. The resin curing process and finish process may be performed at the same place without moving from the winding process or may be performed at a place different from that of winding process after moving from the place.

Resin Adhesion Means

Resin adhesion means 401 attaches resin 2 to fiber bundle 1 in leading process 200 as shown in FIG. 1 or winding process 300 as shown in FIG. 6 in which resin adhesion means 401 is preferably provided on winding head 302. Impregnation roller type resin adhesion means 401 shown in Figs is just an example, which can be replaced by another type of resin adhesion means such as dip type to allow fiber bundles to pass through resin directly and a constant-discharge type to discharge specifically measured resin into the die, to the extent that a predetermined amount of resin is attached and impregnate fiber bundles.

Impregnation roller type resin adhesion means 401 shown in Figs has impregnation roller 403 on which fiber bundle 1 passes through leading guide 201 (or winding guide 303) and then passes through other leading guide 201 (or winding guide 303) to a downstream process. Resin bath 402 containing impregnation roller 403 is filled with resin 2 to be attached to the surface of impregnation roller 402 of which bottom part passes through resin 2. After scraping surplus resin existing on impregnation roller 403 by scraping member 404 to control the amount of resin placed on the roller, fiber bundle 1 passes through impregnation roller 403 to attach controlled amount of resin 2 to fiber bundle 1.

Resin

It is preferable that resin 2 is liquid. A thermosetting resin such as epoxy resin and unsaturated polyester resin or a thermoplastic resin such as polyamide can be used according to intended use, usage environment and required characteristics for products, although it is not limited in particular. From viewpoints of workability and energy consumption, it is preferable to employ a thermosetting resin such as epoxy resin so that the impregnation process can be performed generally at a low resin temperature in a good workability.

Although the impregnating resin should have a low viscosity from a viewpoint of good impregnation, appropriate viscosity is required when the resin having too low viscosity might drop off before sufficiently impregnating in fiber bundles to not maintain a predetermined resin content. Specifically, it is preferable that the viscosity is 10 to 2,000 mPa·s. It is more preferably 100 to 1,100 mPa·s.

Impregnation Promotion Means

As shown in FIG. 7, impregnation promotion means may be provided to promote the resin impregnation (permeation) after resin adhesion means 401.

Impregnation promotion means 501 comprises one or more impregnation guide 502 (wringer bar). Impregnation guide 502 is typically installed as being restricted in rotation of guide around the center axis so that fiber bundle 1 passing through impregnation guide 502 receives reaction force along the thickness direction from impregnation guide 502. The reaction force promotes impregnation of resin 2 attached to fiber bundle 1 by resin adhesion means 401 into fiber bundle 1 so that gaps remaining in fiber bundle 1 can be converted to resin 2. When impregnation guide 502 is provided, fiber bundle 1 is given tension by friction force generated between the surface of impregnation guide 502 and fiber bundle 1 at the time of passing through impregnation guide 502 so that the number of impregnation guides 502 can be designed to be optimum from a viewpoint of balance between impregnation ability and process tension.

Production Speed

From a viewpoint of production efficiency, it is preferable that fiber bundle 1 runs at a speed of 0.1 to 300 m/min. When too fast, the speed may deteriorate product quality without securing resin impregnation time. Further, a trouble such as yarn breakage might be caused by insufficient maintenance when the running resistance of fiber bundle 1 increases or the amount of fiber running per unit time increases to increasingly generate fuzz.

Production Condition Control Based on Condition after Winding Process

Fiber content $V_f$ [%] of resin-impregnated fiber bundle layer in an intermediate product is used as an index of production condition control. Fiber content $V_f$ [%] can be determined by a method which is not limited in particular to the extent of ability to precisely calculate the fiber content in an intermediate product. Such a method may transmit X-ray or the like into the resin-impregnated fiber bundle layer to perform measurement. From a viewpoint of easy measurement, it is preferable that the fiber content is calculated from thickness $t_{FRP}$ [mm] of resin-impregnated fiber bundle layer.

This method of calculating the fiber content from the thickness uses Formula (1):

$$(\text{Fiber content } V_f) = (\text{Thickness of fiber bundle layer containing no resin})/(\text{Thickness of resin-impregnated fiber bundle layer})[\%]. \quad \text{Formula (1):}$$

When the amount of using fiber bundle is known from a design specification and thickness $t_{FRP}$ [mm] is measured, fiber content $V_f$ [%] can be calculated.

Thickness $t_{FRP}$ [mm] can be measured by a method not limited in particular to the extent of ability to precisely detect a thickness of resin-impregnated fiber bundle layer. It is preferable to employ a non-contact type measurement method because such a method can perform a measurement without suspending a process and causing a trouble such as contamination and disturbing fiber bundles.

Production conditions can be set to control fiber content $V_f$ [%] calculated by Formula (1) within each proper range predetermined corresponding to each kind of material so that the desired effect is achieved. Namely, when the amount of using fiber bundle 1 is known from a design specification, the amount of resin adhesion in the resin adhesion means or resin squeeze can be set and optionally surplus resin layer can be removed so that the desired effect is achieved.

It is preferable to control a production condition such as resin adhesion in the resin adhesion means, fiber bundle winding tension, amount of removing surplus resin layer in an intermediate product or resin viscosity in an intermediate product. These production conditions may be combined while another parameter capable of contributing to the control of fiber content $V_f$ [%] in the intermediate product may be selected.

Amount of Resin Adhesion in Resin Adhesion Means

When the amount of resin adhesion is regarded as excessive or short, the amount of resin adhesion can be controlled by resin adhesion means 401. The amount of resin adhesion can be controlled by a method suitable to the type of resin adhesion means 401. For example, the amount of resin adhesion can be increased and decreased by increasing and decreasing the distance between impregnation roller 403 and scraping member 404 in the impregnation roller type shown in the Figs.

For the purposes of precise control of resin adhesion and efficiency of production, it is possible that the position of scraping member 404 is adjusted by driving a motor or the like and is automatically controlled as corresponding to calculated fiber content $V_f$ [%].

Fiber Bundle Winding Tension

The winding tension regarded as excessive or short can be controlled by changing the tension applied at the time of unwinding of fiber bundle bobbin 101 or adjusting the configuration of guide members in processes. It is possible that another tension adjustment mechanism (not shown) is provided in processes. The tension adjustment mechanism may be a dancer roll, a mechanism to adjust the numbers and height of guide members or the like.

For the purposes of precise control of winding tension and efficiency of production, it is possible that a tension sensor or a load cell is further provided in processes to automatically control the winding tension within an appropriate range according to a control parameter of measured values.

Removal of Surplus Resin Layer in the Intermediate Product

When the amount of surplus resin layer in the intermediate product is regarded as excessive, the amount of surplus resin layer can be controlled by a surplus resin layer removal process incorporated into the winding process.

The surplus resin layer can be removed by a method of removing surplus resin layer generated on the outer surface of the intermediate product. It is possible that the surplus resin layer is removed by a method of: rotating the intermediate product while a plate-shaped scraping member such as paddle is pushed onto the outer surface of the intermediate product; moving a paddle while the paddle is pushed onto the outer surface of the intermediate product not rotating; attaching substance to adsorb surplus resin layer; rotating the intermediate product at a high speed to generate centrifugal force; or the like.

For the purposes of precise control of removed resin and efficiency of production, it is possible that the position of scraping member is adjusted by driving a motor or the like to perform resin removal automatically in the method of using the scraping member.

Adjustment of Resin Viscosity in Intermediate Product

When the amount of squeezed resin in the intermediate product is regarded as excessive or short, the amount of squeezed resin can be controlled by adjusting the resin viscosity in the intermediate product. From a viewpoint of easy operation, it is preferable that the resin viscosity is adjusted by heating or cooling down the intermediate product although it is not limited in particular to the extent that the purpose of resin viscosity adjustment is achieved.

In this method, when the squeezed resin is short, the intermediate product can be heated to promote the squeeze of resin so that the resin viscosity decreases. When the squeezed resin is excessive, the intermediate product can be cooled down to suppress the squeeze of resin so that the resin viscosity increases. The squeeze of a kind of resin to promote curing by heating can be suppressed because the resin viscosity increases but decreases by heating.

For the purposes of precise control of resin viscosity and efficiency of production, it is possible that the heating amount or the cooling amount is automatically controlled as corresponding to calculated fiber content $V_f$ [%].

Examples of Measuring Thickness of Resin-Impregnated Fiber Bundle Layer in Winding Process FIG. 8 shows an example of winding process 300 with outer diameter measurement means 310 capable of measuring thickness $t_{FRP}$ [mm] of resin-impregnated fiber bundle layer in the winding process.

The type of outer diameter measurement means 310 operated in the winding process around the production facility is not limited in particular. It is possible that outer diameter measurement means 310 is provided around winding core 301 although outer diameter measurement means 310 may be fixed onto winding head 302.

In this example, outer diameter measurement means 310 is provided with laser photoelectric means comprising optical transmitter 311 and optical receiver 312. As shown in FIG. 9 (A), interrupted ray 313 is transmitted linearly from optical transmitter 311 to be interrupted by resin-impregnated fiber bundle roll body 304 while non-interrupted ray 314 only reaches optical receiver 312 without being interrupted by resin-impregnated fiber bundle roll body 304. Namely, the outer diameter of resin-impregnated fiber bundle roll body 304 corresponds to the area of interrupted ray 313. It is possible that two pairs of optical transmitters 311 and optical receivers 312 are provided as shown in FIG. 9 (B). In this configuration, one pair transmits the ray at a side end of intermediate product while the other pair transmits the ray at the other side end. The outer diameter of the intermediate product can be calculated based on each measured value when the positional relation of two pairs of optical transmitters 311 and optical receivers 312 is known.

From a viewpoint of productivity, it is preferable that the photoelectric means is provided so that the outer diameter can be detected in a short time without suspending processes.

Calculation of Thickness of Resin-Impregnated Fiber Bundle from Outer Diameter

First, outer diameter $d_1$ [mm] of intermediate product shown in FIG. 10 (A) is measured at time $t_1$ in the winding process.

Next, $d_2$ [mm] of intermediate product shown in FIG. 10 (B) is measured at time $t_2$ (later than $t_1$) in the winding process. At time $t_2$, the winding process moves ahead from time $t_1$. Because the outer diameter changes from time $t_1$ to time $t_2$ as a result of resin removal or resin dropping from the rolled resin-impregnated fiber bundle, thickness $t_{FRP}$ [mm] of resin-impregnated fiber bundle remaining finally after being rolled up from time $t_1$ to time $t_2$ can be calculated from the difference between $d_2$ [mm] and $d_1$ [mm].

Namely, thickness $t_{FRP}$ [mm] of the resin-impregnated fiber bundle layer formed between $t_1$ and $t_2$ can be calculated by Formula (2):

$$t_{FRP}=(d_2-d_1)/2 \text{ [mm]}. \qquad \text{Formula (2):}$$

Obtained thickness $t_{FRP}$ [mm] of the resin-impregnated fiber bundle layer is input into Formula (1) to calculate fiber content $V_f$ [%] in resin-impregnated fiber bundle layer 10 after winding, and therefore quality control can be achieved in light of resin dropping in a process or resin dripping on the winding core.

Revision to Actual Thickness of Resin-Impregnated Fiber Bundle Layer

As described above, fiber content $V_f$ [%] in actual resin-impregnated fiber bundle layer 11 greatly contributes to product performance, although the above-described calculation method can only calculate fiber content $V_f$ [%] in resin-impregnated fiber bundle layer 10 including surplus resin layer 12. To precisely calculate the thickness of actual resin-impregnated fiber bundle layer 11 only, it is preferable that surplus resin layer thickness measurement means 320 is further provided. It is possible that surplus resin layer thickness measurement means 320 is provided around winding core 301 although it may be fixed onto winding head 302. Surplus resin layer thickness measurement means 320 can extract only the thickness of surplus resin layer 12. It is not limited in particular and may be ultrasonic wave type, photoelectric type or the like.

Figure 12:
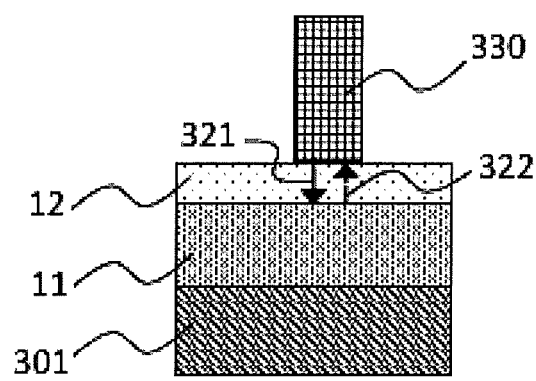
FIG. 12 is a schematic view showing a surplus resin layer thickness measurement of an ultrasonic wave type.

FIG. 12 shows contact type of ultrasonic thickness meter 330 as an example of surplus resin layer thickness measurement means 320. Incident wave 321 is reflected at the interface between resin-impregnated fiber bundle layer 11 and surplus resin layer 12 to become reflection wave 322 to be taken in by surplus resin layer thickness measurement means 320. The thickness of surplus resin layer 12 can be calculated from time for taking in and sonic speed in surplus resin layer 12.

FIG. 14 shows non-contact type of laser film thickness meter 331 as an example of surplus resin layer thickness measurement means 320. As shown in FIG. 15, when incident light 323 is irradiated some part of rays is reflected at the surface of surplus resin layer 12 to become first reflection light 324 to be taken in by laser film thickness meter 331 while the other part of rays permeating through surplus resin layer 12 is reflected at the surface of actual resin-impregnated fiber bundle layer 11 to become second reflection light 325 to be taken in by laser thickness film thickness meter 331. First reflection light 324 and second reflection light 325 are individually recognized to calculate the thickness of surplus resin layer 12. From a viewpoint of productivity, it is preferable to employ a photoelectric type such as laser film thickness meter so that the thickness of surplus resin layer 12 can be detected in a short time without suspending processes.

Although thickness $t_{FRP}$ [mm] of the resin-impregnated fiber bundle layer can be calculated from outer diameter measured as well, it is preferable that surplus resin layer thickness $t_r$ [mm] shown in FIG. 13 is measured and input to Formula (3) which is made by adding a revision of surplus resin layer 12 to Formula (2) so that thickness $t_{FRP}$ [mm] of the resin-impregnated fiber bundle layer can be calculated by extracting only the actual thickness of resin-impregnated fiber bundle 11:

$$t_{FRP}=(d_2/2-t_r)-(d_1/2) \text{ [mm]}. \quad \text{Formula (3):}$$

Thickness trap [mm] of the resin-impregnated fiber bundle layer calculated by Formula (3) is input into Formula (1) to calculate fiber content $V_f$ [%] in actual resin-impregnated fiber bundle layer 11, and therefore a higher level of quality control can be achieved in light of resin squeezed on the winding core or the like.

Contact Type Measurement Method of Thickness of Resin-Impregnated Fiber Bundle Layer The contact type measurement method may be performed by calculating outer diameter from the circumferential length measured by a measuring tape wound around resin-impregnated fiber bundle roll body 304 or the like. From a viewpoint of quick measurement, it is preferable to employ a sandwich type of resin-impregnated fiber bundle layer thickness measurement method.

FIG. 16 shows an example of production method using sandwich type outer diameter measurement means 340.

Sandwich type outer diameter measurement means 340 comprises a pair of measurement heads 341 for sandwiching resin-impregnated fiber bundle roll body 304. The outer diameter of resin-impregnated fiber bundle roll body 304 can be calculated from the relative positional relation of measurement heads 341 to calculate the thickness of resin-impregnated fiber bundle layer from the difference from diameter of winding core 301. The sandwich type shown in FIG. 17 capable of pushing surplus resin layer 12 off to measure the outer diameter can measure the actual thickness of resin-impregnated fiber bundle layer 11.

This method requiring only a simple device configuration contributes to a precise process control as measuring thickness $t_{FRP}$ [mm] of resin-impregnated fiber bundle layer of extracted actual thickness of resin-impregnated fiber bundle layer 11. From viewpoints of prevention of unnecessary resin scraping and disturbed fiber bundle, it is preferable that the outer diameter is measured while resin-impregnated fiber bundle roll body 304 is sandwiched by measurement heads 341 after the process is once suspended.

Other Examples

Our methods are not limited to the examples, but can be modified in each member selection or layout to the extent of examples based on similar technical thought.

The invention claimed is:

1. A method of producing a resin-impregnated fiber bundle roll body, comprising:
    an unwinding step that takes off a fiber bundle from a bobbin;
    a winding step that rolls up the fiber bundle on a winding core rotating around a fixed axis through a movable winding head to prepare a product; and
    a leading step that leads the fiber bundle taken off in the unwinding step to the winding step between the unwinding step and the winding step, wherein
    the leading step or the winding step includes a resin adhesion operation to impregnate the fiber bundle with a resin,
    the winding step includes a fiber content calculation operation to calculate a fiber content $V_f$ [%] in a layer of the resin-impregnated fiber bundle being rolled up on the winding core of an intermediate product to control any one of (i) to (iv) according to the fiber content $V_f$ [%]:
    (i) a resin adhesion amount in the resin adhesion operation;
    (ii) a winding tension of the fiber bundle applied to the intermediate product;
    (iii) a removal amount of a surplus resin layer generated on an outer surface of the intermediate product; and
    (iv) a resin viscosity in the intermediate product,
    the winding step further includes a resin-impregnated fiber bundle layer thickness calculation operation to calculate a thickness $t_{FRP}$ of the layer of the resin-impregnated fiber bundle and then the fiber content calculation operation is performed by using the thickness $t_{FRP}$,
    the winding step further includes an outer diameter measurement operation to measure an outer diameter of the winding core or the intermediate product, and
    the thickness $t_{FRP}$ of the layer of the resin-impregnated fiber bundle, formed between a first time $t_1$ and a second time $t_2$ later than first time $t_1$, is calculated by using: a first outer diameter $d_1$ of the winding core or the intermediate product at the first time $t_1$, and a second outer diameter $d_2$ of the winding core or the intermediate product at the second time $t_2$, the first and second outer diameters $d_1$ and $d_2$ being measured by the outer diameter measurement operation.

2. The method according to claim 1, wherein
the winding step further includes a surplus resin layer thickness measurement operation to measure a thickness tr of the surplus resin layer generated on the outer surface of the intermediate product, and
the thickness $t_{FRP}$ of the layer of the resin-impregnated fiber bundle formed between the first time $t_1$ and the second time $t_2$ is calculated by using: the first outer diameter $d_1$; the second outer diameter $d_2$; and the thickness tr of the surplus resin layer measured by the surplus resin layer thickness measurement operation at the second time $t_2$.

3. The method according to claim 2, wherein the surplus resin layer thick-ness measurement operation is performed by a photoelectric means or an ultrasonic wave means.

4. The method according to claim 1, wherein the outer diameter measurement operation is performed by a photoelectric means.

5. The method according to claim 2, wherein the outer diameter measurement operation is performed by a photoelectric means.

6. The method according to claim 3, wherein the outer diameter measurement operation is performed by a photoelectric means.

* * * * *